Dec. 13, 1938.     M. L. MENNESSON     2,139,841
REGULATING DEVICE FOR INTERNAL COMBUSTION ENGINES
Filed Sept. 24, 1934     3 Sheets-Sheet 2
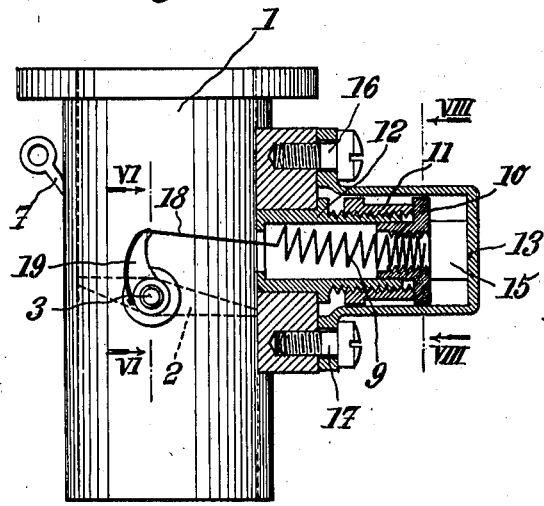
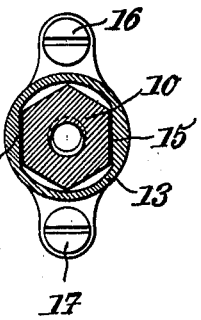
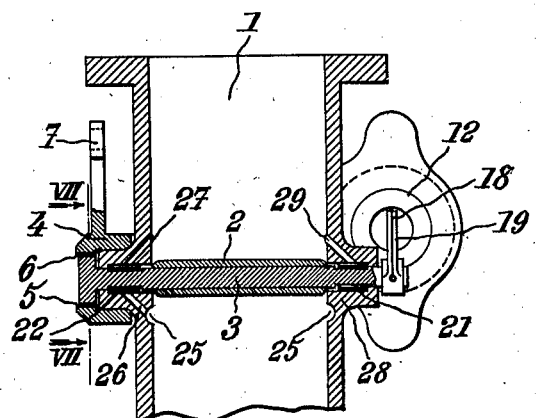
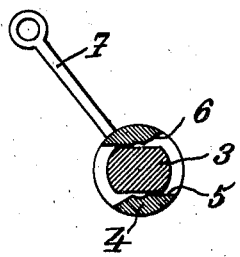
Inventor:
Marcel Louis Mennesson
Attorneys:

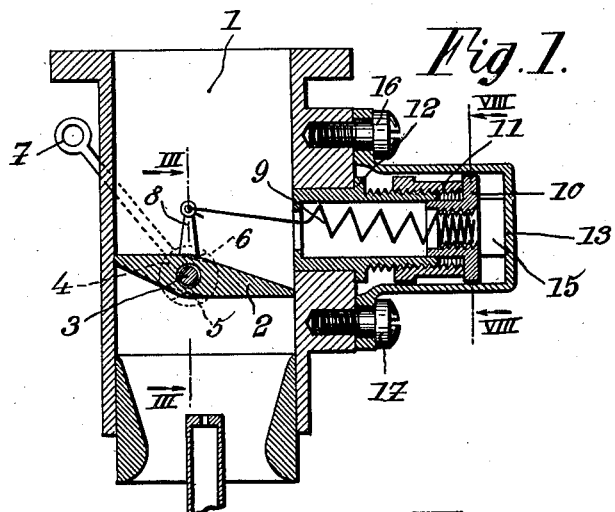
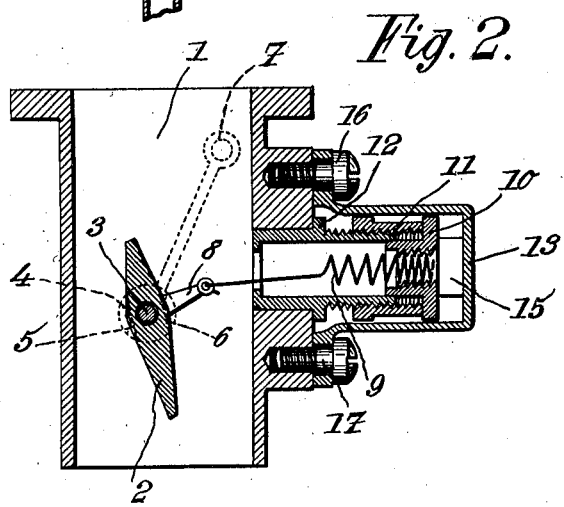
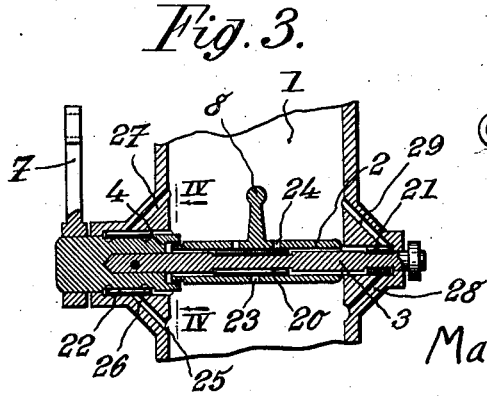

Dec. 13, 1938. M. L. MENNESSON 2,139,841
REGULATING DEVICE FOR INTERNAL COMBUSTION ENGINES
Filed Sept. 24, 1934 3 Sheets-Sheet 3

Inventor:
Marcel Louis Mennesson
Attorneys:

Patented Dec. 13, 1938

2,139,841

UNITED STATES PATENT OFFICE 2,139,841

REGULATING DEVICE FOR INTERNAL COMBUSTION ENGINES

Marcel Louis Mennesson, Neuilly-sur-Seine, France, assignor to "Société Anonyme Solex", Neuilly-sur-Seine, France, a corporation of France Application September 24, 1934, Serial No. 745,350
In France April 3, 1934

11 Claims. (Cl. 261—65)

This invention relates to a device for regulating the admission of atomized mixture to an internal combustion engine and thereby governing the speed of the engine.

To limit the speed of internal combustion engines, it is known to provide, in the induction pipe thereof, an admission regulator for the gases which regulator is controlled by the suction. Such a regulator may be constituted by a butterfly valve automatically moved toward its closed position by a spring and of which the axis of rotation is offset from the centre line of the induction pipe in such a way that the said butterfly valve is asymmetric about its axis of rotation. Such a butterfly valve tends to be moved under the effect of the difference existing between the pressures on the two sides of the valve and which are determined or produced by its presence. The position of equilibrium of the valve depends on the equilibrium between the pressure of the gases and the tension of its return spring. The butterfly valve thus tends to close when the pressure of the gas mixture acting in the direction of closing of the valve becomes greater than the pull of the spring, that is to say when the engine tends to turn too quickly. The speed of the engine can thus be governed by the admission of the atomized mixture at the point at which the pressure on the valve is balanced by the pull of its spring.

The present invention has for its object to improve speed regulators of this kind.

In accordance with the present invention, an admission regulator employing an asymmetric butterfly valve is arranged in such a way that it may be utilized at the same time as the ordinary acceleration control valve. This arrangement is advantageous on account of the small space occupied, low cost of manufacture and simplicity.

For this purpose, the regulating butterfly valve is arranged in such a way that it can turn freely on the shaft operated by the usual accelerator control but at the same time can be actuated by the rotary movement of the said shaft to be utilized as a valve for the atomized mixture by means of abutments between which there is left only a certain free angle of oscillation for the valve. By this fact the usual return spring of the accelerator control acts by means of the shaft and the abutments in opposition to the spring of the admission regulator, to move the valve into the position of closing. For the opening movement produced by the accelerator control, the butterfly valve follows this control under the action of the spring of the admission regulator. Within the limits of the accelerator control, however, the position of the butterfly valve is determined by the equilibrium between the pressure of the gases and the pull of its regulating spring, and when the engine tends to turn too quickly, the valve, in closing, thereby acts as an admission regulator and as a governor for the engine.

In a regulator of this kind the spring should be disposed in such a way that it has a tendency to open the valve towards the intake end of the induction pipe while at the same time the asymmetric arrangement of the valve should tend to close it under the pressure of the incoming atomized mixture. It follows from this arrangement that the tension of the spring is at a maximum for the closing position of the valve, so that the pull thereof is actually greater for the positions of the valve near closing, for which the difference between the pressures of the incoming mixture beyond and in front of the valve is greater and the pressure on the valve is greater than for the positions adjacent full opening for which this pressure also becomes much less. With the displacement of the butterfly valve the two opposing forces, acting on the regulating device, vary in the same direction. It would thus be desirable so to arrange the parts that equilibrium between the forces may be realized and the regulating action possible for any intermediate position of opening of the valve. The action of the regulator would then depend not on the quantities of atomized mixture admitted but solely on the variations of pressure on the valve determined by the speed variation of the engine when its load varies. The regulating device would thus act—between the limits of oscillation permitted by the abutments for each position of the accelerator control—independently of the quantity of mixture admitted by the opening of the valve determined by the usual accelerator control and solely as a function of the variation of the pressure of admission of this mixture which results from the excess speed which the engine may have according to its loading, with the accelerator control in a given position.

According to a further feature of the invention, for obtaining a suitable proportion between the forces acting on the regulating arrangement, so that the action of this arrangement may be utilized whatever the position of opening of the valve, the point of attachement of the spring relatively to the valve is chosen in such a way that, not only as indicated above, is the pull of this spring a minimum for the full opening of the valve, but also that the lever arm of the said spring is also a minimum for this full opening and a maximum for closing.

For this purpose, the said lever arm can be varied by means of a suitable cam inserted in the connection between the spring and the butterfly valve or a suitable articulation provided in the said connection or gain, and more simply the points of attachment of the said spring can be disposed in such a way that the arm of the butterfly valve forms with the line of pull of the spring, a more acute angle for the position of closing than for the position of opening, for example in such a way that the lever arm of the valve makes an angle of about 90° with the line of pull of the spring for the position of closing, while, for the position of opening, this arm comes practically into the extension of the line of pull. With the movement of the valve towards the opening, the displacement and consequently the traction effort of the spring, varies as the sine of the arc described by the valve and becomes more and more small relatively to that of the valve. It follows that there is obtained on the one hand the diminution of the lever arm to which this traction effort is applied and, on the other hand, a smaller variation of the traction effort.

By suitably proportioning the parts, the constructional conditions of the invention are arranged to fulfill perfectly the conditions of use specified above and permit a utilization of the arrangement in which, as is desired, the action of the regulator depends not on the position of the valve as determined by the accelerator control and the quantity of mixture which can be admitted in the said position, but only on the variation of the admission pressure of the mixture which results, at the said controlled position of opening, from a variation of the load of the engine producing an acceleration.

Other features of the invention consist in adding to the spring of regulators of the kind in question, means adapted to regulate its length and its tension, the said means being advantageously completed by an arrangement for preventing variation of adjustment; in ensuring the freedom of the movements of the regulator relatively to the control, by means of bearings, for example roller bearings, at the various points of friction; and in effecting, by the passage of the fuel to the said points of friction, the lubrication of the friction surfaces in the assembly of the regulator and of the control.

In order that the invention may be more clearly understood, reference will now be made to the accompanying drawings, in which:—

Figs. 1 and 2 show, in diagrammatic section, the induction pipe of a carburettor, constructed according to the invention, certain parts occupying different characteristic positions on the two figures.

Figs. 3 and 4 show the same arrangement respectively in section on III—III, Fig. 1, and in section on IV—IV, Fig. 3.

Fig. 5 shows in partial vertical section, a variation of the arrangement according to Fig. 1.

Figs. 6, 7 and 8 show the same arrangement respectively in section on VI—VI, Fig. 5, in section on VII—VII, Fig. 6, and in section on VIII—VIII, Fig. 1.

Figure 9:
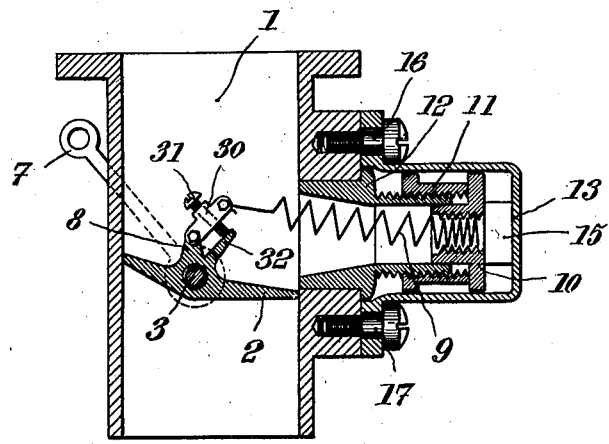
Figure 10:
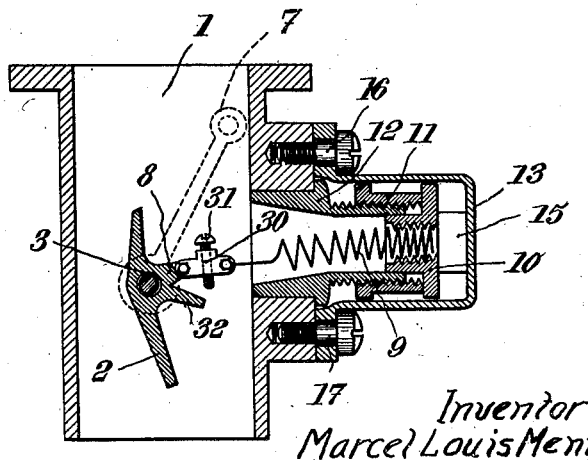

Figs. 9 and 10 finally show another variation of the arrangement according to Figs. 1 and 2, in vertical partial section, certain of the parts occupying also different characteristic positions.

As shown on the drawings, in the admission pipe 1 of a carburettor there is provided (Figs. 1, 2 and 3) a butterfly valve 2 which can oscillate around the shaft 3, and said shaft does not pass through the centre of the said admission pipe 1 but is offset relatively thereto in such a way that the said valve 2 can open towards the intake end of the said admission pipe 1.

The shaft 3 is solid with a ring 4 (Fig. 3) which acts as a pivot in the body 1 and which embodies the abutments 5 and 6 limiting the freedom of oscillation of the valve 2 on the shaft 3 (Fig. 4).

The ring 4 is solid with the control lever 7 actuated by the usual accelerator pedal or handle.

The valve 2 carries an arm 8 to which is attached a spring 9 arranged in such a way that the angle made by its line of pull with the arm 8 is more acute in the position of closing of the valve than the position of opening. The other extremity of the said spring is fixed in a threaded ring 10 in which the terminal spirals of the spring 9 are screwed. This ring 10 rests, by a collar, on the extremity of a ring 11 screwed on the cylindrical support 12 solid with the body 1.

The collars of the rings 10 and 11 embody flats which by fitting against the corresponding faces 14 and 15 of the cover 13, immobilize the said rings, upon the fixing of the said cover on the body 1 by the screws or bolts 16 and 17. A suitable lead sealing device can make the assembly not liable to tampering so as to prevent the adjustment of the regulating device from being liable to alteration by the driver of the vehicle.

In the position of stopping (Fig. 1), the control shaft 3, solid with the accelerator pedal or handle, moves the valve 2 into the closing position by the abutment 5 under the action of the usual return spring of the accelerator control, while the regulator spring 9, acting in opposition with the said return spring, tends to maintain the valve 2 against the abutment 5. In operation and until a certain speed of the engine is attained, the valve 2 remains applied against the abutment 5 under the effect of the pull of the said spring 9 and is held open towards the intake end of the admission pipe 1 by following the rotary movement of the shafts 3 and 4 solid with one another against the pressure of the gases which tend to close it.

The abutments 5 and 6 of the shaft 3 are arranged in such a way that when fully open (Fig. 2) the valve then occupies an inclined position to the air streams and this always in such a direction that the pressure of the incoming mixture ends to produce its closing. As the speed of the incoming mixture increases with that of the engine, if the regulation of the tension of the spring 9 is suitable, the equilibrium between the opposing forces acting on the butterfly valve is exceeded for a given speed of the engine, which produces an oscillatory movement of the valve towards the closed position up to the position where a new equilibrium of the forces is obtained.

When such an arrangement is utilized on an automobile vehicle and as a regulation operation which is either complete or non-existant is not acceptable for such an application, the object to be attained is to proportion the opening of the valve strictly to the load on the engine in the course of variations of this load—which are independent of the driving and produced by the loading of the vehicle, the nature of the journey or like factors—in such a way as to preserve a continuous operation without stoppages, at a substantially constant speed. This condition is fully realized by the utilization of the invention described.

For the same speed of the engine, if the position of the valve varies according to the load on this engine, the forces to which this valve is subjected are themselves variable according to the speed and the pressure of the incoming mixture, which depends on the said speed and the said load of the engine. The valve is in effect subjected to two pressure factors, the kinetic energy or flow of air and the difference between the pressures in front of and beyond the valve. The first factor is dominant towards full opening and the second towards closing. The pressure on the valve does not vary exactly in the same proportion as the pull of the spring according to the position of the valve and it is necessary to modify the length of the lever arm by means of which this spring acts on the valve in such a way as to shorten this lever arm proportionally to the degree of opening of the valve.

By suitably choosing the eccentricity of the butterfly valve 2 and the curve described by the point of attachment of the spring 9 to the said valve, the regulating device may be balanced for all positions of the valve by means of a single spring 9 in such a way that this arrangement acts solely as a function of the variations of load of the engine for every opening of the valve limited by the control means, that is to say for each limiting speed of the engine corresponding to each limit opening.

As regards the regulation, it should be noted that the two elements (eccentricity of the butterfly valve and curve of the point of attachment of the spring) being determined by the construction, the regulation consists in giving to this spring the desired tension in order that the butterfly valve closes at the maximum chosen speed and in adopting a tension curve as a function of its extension which ensures opposing forces for all positions of the said valve.

The first adjustment, that is to say the adjustment of the tension of the spring 9, is obtained by turning the ring 11 in such a way as to screw it on or unscrew it from the fixed ring 12 and thereby to vary the distance between the points of attachment of the spring 9 between the arm 8 and the ring 10.

The second adjustment is obtained by turning the ring 10 in such a way as to vary the number of active spirals of the spring 9 and consequently the pull exerted thereby in the course of movement towards the closing of the valve.

If, by reason of the regulation, the speed at reduced load is lower than the speed at full load, that is to say if the action of the regulator is too rapid, the number of active spirals is reduced and inversely, if at reduced load, the speed increases too much, that is to say if the regulator is too sluggish, the number of active spirals is increased.

Preferably, the threading of the ring 11 has the same pitch as the threading of the ring 10, in which the spring 9 is screwed, in such a way as to facilitate the regulation. It is sufficient to regulate the tension of the spring by acting on the ring 11, then if the number of spirals is to be modified, to turn together in the desired direction the parts 10 and 11, for example by turning the whole by means of the flats of the member 13 (Fig. 8). One can thus vary the number of spirals utilized without acting on the initial tension of the spring 9, provided for the position of opening of the valve.

The regulation being completed, the parts 10 and 11 are secured in an absolute manner and protected against any accidental variation by means of the cover 13. To this end the parts 10 and 11 may be grooved, on their outer periphery, while one or more tongues solid with the cover 13 are engaged in these grooves. Or, more simply—and as stated above—the parts 10 and 11 may be shaped in metal to have a hexagonal profile and engaged by two flat parts 14 and 15 of the member 13 (Fig. 8).

On Figs. 5, 6 and 7, as a variation of the method of construction of Fig. 1, the spring 9, instead of being directly attached to the lever arm 8 of the valve 2, is associated with a cable 18 passing over a cam 19 solid with the spindle 3 and of suitable profile to vary the distance between the shaft of the valve and the point of application of the cable on the said cam, that is to say to vary the lever arm acting on the valve, as described above with reference to Fig. 1. For this method of construction (Fig. 6) the valve 2 is solid with the shaft 3 and the latter carries, at one of its extremities, the cam 19 in such a way that the assembly constituted by the cam 19, the cable 18, the spring 9 and its regulating members 10 and 11, are arranged outside the body of the pipe 1. At the other extremity of this shaft 3 there are then provided the abutments 5 and 6 and the assembly of the control members of the accelerator 4—7 (Fig. 7).

On Figs. 9 and 10, as a variation of the method of construction of Fig. 1, the curve described by the point of attachment of the spring 9 to the valve is obtained, not only by arranging the points of attachment of the spring so that the angle formed by the line of pull of this spring with the lever arm of the valve is more acute in the position of closing of this valve than in the position of opening, but also by arranging the point of attachment of the spring to the lever arm of the valve on an articulated element by means of which this lever arm itself varies and becomes the maximum for the position of closing. To this end, this arm is formed by an arm 8 solid with the valve 2 and a movable arm 30 articulated to the extremity of the arm 8 and to which is fixed the point of attachment of the spring 9. This movable arm 30 carries a screw abutment 31 which, in course of movement towards the closing of the valve, comes into contact with a second fixed arm 32 on the valve. For this method of realization, the movable arm 30, pivoting on the extremity of the fixed arm 8, is free to be displaced in the continuation of the line of action of the spring 9 (Fig. 10) until the screw abutment 31 contacts with the arm 32 whereupon the said arm 30 becomes solid in movement with the arm 8 and instead of remaining in the continuation of the line of action of the spring 9, it becomes equivalent to a rigid extension of the lever arm 8 (Fig. 9). As the lever arm varies in such a way as to be a minimum for the full opening of the valve and a maximum for its closing, it will be seen that according to the arrangement shown on Figs. 9 and 10, this lever arm is only in reality that of the arm 8 in the position of opening (Fig. 10), while there is added thereto the length of the arm 30 during the movement towards closing (Fig. 9). By means of the screw 31, one can regulate the moment when the arms 8 and 30 commence to move together as one as well as the angle for which they remain solid in movement and consequently the effective length of the lever arm of the point of attachment of the spring 9 to the valve.

In practice, the arrangement comprising two degrees of regulation, shown on Figs. 9 and 10, permits first of all a regulation to be effected suitable for the periods near full opening by means of a small lever arm and a small displacement of the point of attachment. The said first regulation can thus be made independently of that necessary for smaller openings of the valve for which it is necessary to supplement the effect of this first regulation by making use of a larger lever arm and a larger displacement of the point of attachment of the spring, which is obtained by regulating the moment when the screw-abutment 31 comes into contact with the arm 32.

It is absolutely necessary, for a suitable operation of the regulator, to prevent all adherence and all binding of the valve on its shaft or of this shaft in the body of the pipe, in such a way as to preserve the regulation which has been made by taking account of the substantial friction between these parts. The pressures of the air on the valve, particularly near the position of closing, are such that the value of the friction of this valve on its shaft plays a considerable part in the setting of the regulator.

The present invention contemplates the use of bearings—for example roller bearings—such as 20, 21, 22 (Figs. 5 and 6) interposed, on assembly, at all friction points both of the valve on its shaft as also of this shaft in the body of the pipe 1.

Further, conjointly or not with the foregoing arrangement and according to the invention, use is made, for effecting the lubrication or bathing with liquid of the said friction points, of the following arrangement:

The fuel, in being sprayed from the jet, is always more or less projected onto the valve and the walls of the body 1. Consequently, if suitable spaces or gaps are left between the valve and its shaft, as well as between the said shaft and the body 1 in which it turns, particles of fuel adhering to the walls of the body 1 pass, under the effect of the suction acting in front of and beyond the valve, through these spaces or gaps, the said particles being deposited, for example, on the rollers 20, 21, 22, which may be provided at the said points. By evaporation, these particles of fuel deposit, at these points, their heavy constituents which form actually an oily fluid body adapted to effect a constantly renewed lubrication.

On Fig. 3, the suction through the spaces or gaps is increased by the provision of orifices such as 23 and 24 provided in the face of the bearing 20. On Fig. 6, the fuel projected on the walls of the body 1 and collecting in the groove 25, is sucked forwards and backwards by the passages 26—27 and 28—29 so as to circulate around the bearings of the shafts and the bearings 21 and 22.

The invention is not limited to the precise forms or details of construction described, as these may be varied to suit particular cases.

What I claim is:

1. A carburetor for internal combustion engines, comprising, an offset pivoted throttle valve accomplishing all the usual functions of an ordinary carburetor throttle, a movable member having a shoulder thereon, a lost-motion connection between the shoulder and the valve, means controlled by the operator to control positively the position of said shoulder, an arm integral with the throttle valve, and a spring connected at one end to the arm and at the other end to an element adjustably mounted with respect to the body of the carburetor so as to maintain the valve in active engagement with the shoulder against the action of suction in the inlet conduit of the carburetor as long as the speed of the motor does not exceed the greatest permissible speed, said arm and spring being arranged with respect to each other so that the leverage with which the said spring acts on the throttle valve varies in inverse proportions with the degree of opening of the valve.

2. A carburetor for internal combustion engines comprising, an offset pivoted throttle valve accomplishing all the usual functions of an ordinary carburetor throttle, a member having a shoulder thereon, a lost-motion connection between the shoulder and the valve, means controlled by the operator to control positively the position of this shoulder, a member pivotally connected to the valve around an axis parallel to the axis of rotation of the valve, a shoulder integral with the valve, a stop on said pivoted member arranged to engage against said last mentioned shoulder, a spring joined at one end to the free end of the said pivoted member and at its other end to an element secured to the body of the carburetor, whereby the stop is moved against the shoulder in the course of movement of the valve from its opening position to its closing position, said spring thus maintaining the valve in active engagement with the first movable shoulder against the action of suction in the inlet conduit of the carburetor as long as the speed of the motor does not exceed the maximum permissible speed, the pivoted member and the spring being arranged with respect to each other so that the leverage with which said spring acts on the valve varies in inverse ratio to the degree of opening of the valve.

3. A carburetor for internal combustion engines comprising, an offset pivoted throttle valve accomplising all the usual functions of the ordinary carburetor throttle, a member having a shoulder thereon, a lost-motion connection between said shoulder and the valve, means controlled by the operator to control positively the position of the shoulder, spring means to maintain the valve in active engagement with the shoulder against the action of suction in the inlet conduit of the carburetor as long as the motor does not exceed the maximum permissible speed, means for regulating the tension of said spring means, and cover means for said spring regulating means adapted to be rigidly secured to the body of the carburetor, said cover means including means operable when said cover means is placed in covering position for locking the spring regulating means in its regulated position.

4. A carburetor for internal combustion engines comprising, an offset throttle valve pivoted in the body of the carburetor and accomplishing all the usual functions of the ordinary carburetor throttle valve, an element mounted in the body of the carburetor coaxially with respect to the axis of rotation of said throttle valve, a lever rigid with said element, a lost-motion connection between the lever and the valve, means controlled by the operator to control positively the position of said lever, said means also acting on said coaxially mounted element, a spring arrangement for holding the valve in active engagement with the lever against the action of suction within the inlet conduit of the carburetor as long as the speed of the engine does not exceed the maximum permissible speed, and rollers positioned between the valve and the coaxially mounted element.

5. A carburetor for internal combustion engines comprising an offset pivoted throttle valve accomplishing all the usual functions of the ordinary carburetor throttle, said valve being so arranged that the suction acting on the offset portion thereof tends to move the valve to closed position, a member having shoulders thereon, a lost motion connection between said shoulders and said valve, means controlled by the operator to control positively the position of said shoulders, a spring arrangement for holding the valve in active engagement with one of said shoulders against the action of suction thereupon, said shoulders being so positioned that when said means moves to one extreme position one of the shoulders substantially completely closes said valve, while when said means moves to the other extreme position the other shoulder slightly opens said valve.

6. A carburetor for internal combustion engines comprising a mixing chamber, means to supply fuel to said mixing chamber, a rotatable member, an offset throttle valve pivoted on said member located on the downstream side of said supply means and accomplishing all the usual functions of the ordinary carburetor throttle valve, said valve being so arranged that the suction acting on the offset portion thereof tends to move the valve to closed position, a lever rigid with said member, a lost-motion connection between the member and the valve, means controlled by the operator to control positively the position of said lever, and a spring arrangement for holding the valve in active engagement with the member against the action of suction within the inlet conduit of the carburetor as long as the speed of the engine does not exceed the maximum permissible speed.

7. In a carburetor having a passage, a throttle valve in said passage, a member on which said throttle valve is mounted, means in the walls of said passage pivotally mounting said member, and passages connecting said mounting means and the first passage, whereby fuel sucked into said last passages lubricates continuously said mounting means.

8. In a carburetor having a passage, a throttle valve in said passage, a member on which said throttle valve is turnably mounted, the middle of said valve having passages therein communicating with the bearing surface of the valve on the member whereby fuel sucked into said last passage lubricates continuously said bearing surface.

9. A carburetor as claimed in claim 5, in which said member is rotatable and said valve is pivoted on said member.

10. A carburetor for internal combustion engines comprising a mixing chamber, means to supply fuel to said mixing chamber, a spindle mounted to turn in the walls of said mixing chamber and eccentric with respect thereto, an offset throttle valve freely mounted on said spindle and traversed thereby, said throttle valve being located on the downstream side of said supply means and accomplishing all the usual functions of the carburetor throttle valve, said valve being so arranged that the suction acting on the offset portion thereof tends to move the valve to closed position, a lever rigid with said spindle, a lost motion connection between the spindle and the valve, means controlled by the operator to control positively the position of said lever, and a spring arrangement for holding the valve in active engagement with the spindle against the action of suction within the inlet conduit of the carburetor as long as the speed of the engine does not exceed the maximum permissible speed.

11. A carburetor for internal combustion engines comprising a mixing chamber, means to supply fuel to said mixing chamber, a rotatable member, an offset throttle valve pivoted on said member located on the downstream side of said supply means and accomplishing all the usual functions of the ordinary carburetor throttle valve, said valve being so arranged that the suction acting on the offset portion thereof tends to move the valve to closed position, a lever rigid with said member, a lost-motion connection between the member and the valve, means controlled by the operator to control positively the position of said lever, and a spring arrangement for holding the valve in active engagement with the member against the action of suction within the inlet conduit of the carburetor as long as the speed of the engine does not exceed the maximum permissible speed, the middle of said valve having passages therein communicating with the bearing surface of the valve on the member, whereby fuel sucked into said last passage lubricates continuously said bearing surface.

MARCEL LOUIS MENNESSON.